(12) United States Patent
Rosenberg et al.

(10) Patent No.: US 8,438,613 B2
(45) Date of Patent: May 7, 2013

(54) ESTABLISHING FACETS OF A POLICY FOR A COMMUNICATION SESSION

(75) Inventors: Jonathan D. Rosenberg, Freehold, NJ (US); Flemming S. Andreasen, Marlboro, NJ (US); Timothy P. Stammers, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 1462 days.

(21) Appl. No.: 11/715,065

(22) Filed: Mar. 6, 2007

(65) Prior Publication Data

US 2007/0220251 A1    Sep. 20, 2007

Related U.S. Application Data

(60) Provisional application No. 60/780,176, filed on Mar. 6, 2006.

(51) Int. Cl.
| G06F 7/04 | (2006.01) |
| G06F 15/16 | (2006.01) |
| G06F 17/30 | (2006.01) |
| H04L 29/06 | (2006.01) |

(52) U.S. Cl.
USPC .......................... 726/3; 726/1; 726/6; 726/13

(58) Field of Classification Search .................. 370/331; 713/171; 726/1, 3, 13, 6
See application file for complete search history.

(56) References Cited

U.S. PATENT DOCUMENTS

| 5,602,907 | A | 2/1997 | Hata et al. | 379/114 |
| 5,822,411 | A | 10/1998 | Swale et al. | 379/111 |
| 5,828,737 | A | 10/1998 | Sawyer | 379/114 |
| 5,905,736 | A | 5/1999 | Ronen et al. | 370/546 |
| 5,909,238 | A | 6/1999 | Nagashima et al. | 348/3 |
| 5,946,670 | A | 8/1999 | Motohashi et al. | 705/400 |

(Continued)

FOREIGN PATENT DOCUMENTS

| EP | 1 250 023 A1 | 10/2002 |
| WO | WO 98/26381 | 12/1997 |

(Continued)

OTHER PUBLICATIONS

PCT Notification of Transmittal of the International Search Report and the Written Opinion of the International Searching Authority, or the Declaration with attached PCT International Search Report and Written Opinion of the International Searching Authority in International Application No. PCT/US07/05900, dated Feb. 5, 2008, 7 pages.

(Continued)

*Primary Examiner* — Jeffrey Pwu
*Assistant Examiner* — Jayesh Jhaveri
(74) *Attorney, Agent, or Firm* — Baker Botts L.L.P.

(57) ABSTRACT

Establishing one or more facets of a policy includes facilitating a communication session for an access terminal at a visited network. The access terminal is associated with a home network having a home policy server. The policy is received at a visited policy server of the visited network. The policy comprises the facets. If the facets are unacceptable, the facets are negotiated until a stopping point is reached. The negotiation includes adjusting by the visited policy server at least one facet of the one or more facets, and notifying the home policy server of the adjustment. The facets are established in accordance with the negotiation.

15 Claims, 4 Drawing Sheets

U.S. PATENT DOCUMENTS

| | | | | |
|---|---|---|---|---|
| 5,956,391 | A | 9/1999 | Melen et al. | 379/114 |
| 5,970,477 | A | 10/1999 | Roden | 705/32 |
| 5,987,498 | A | 11/1999 | Athing et al. | 709/203 |
| 6,016,509 | A | 1/2000 | Dedrick | 709/224 |
| 6,035,281 | A | 3/2000 | Crosskey et al. | 705/14 |
| 6,047,051 | A | 4/2000 | Ginzboorg et al. | 379/130 |
| 6,070,192 | A | 5/2000 | Holt et al. | 709/227 |
| 6,075,854 | A | 6/2000 | Copley et al. | 379/211 |
| 6,131,024 | A | 10/2000 | Boltz | 455/405 |
| 6,137,791 | A | 10/2000 | Frid et al. | 370/352 |
| 6,141,684 | A | 10/2000 | McDonald et al. | 709/222 |
| 6,175,879 | B1 | 1/2001 | Shah et al. | 709/330 |
| 6,208,977 | B1 | 3/2001 | Hernandez et al. | 705/34 |
| 6,229,887 | B1 | 5/2001 | Albers et al. | 379/219 |
| 6,282,573 | B1 | 8/2001 | Darago et al. | 709/229 |
| 6,295,447 | B1 | 9/2001 | Reichelt et al. | 455/417 |
| 6,330,562 | B1 | 12/2001 | Boden et al. | 707/10 |
| 6,332,163 | B1 | 12/2001 | Bowman-Amuah | 709/231 |
| 6,339,832 | B1 | 1/2002 | Bowman-Amuah | 714/35 |
| 6,434,568 | B1 | 8/2002 | Bowman-Amuah | 707/103 R |
| 6,434,628 | B1 | 8/2002 | Bowman-Amuah | 714/48 |
| 6,438,594 | B1 | 8/2002 | Bowman-Amuah | 709/225 |
| 6,442,748 | B1 | 8/2002 | Bowman-Amuah | 717/108 |
| 6,466,964 | B1 | 10/2002 | Leung et al. | 709/202 |
| 6,477,580 | B1 | 11/2002 | Bowman-Amuah | 709/231 |
| 6,477,665 | B1 | 11/2002 | Bowman-Amuah | 714/39 |
| 6,480,485 | B1 | 11/2002 | Kari et al. | 370/352 |
| 6,490,451 | B1 | 12/2002 | Denman et al. | 455/436 |
| 6,493,547 | B1 | 12/2002 | Raith | 455/405 |
| 6,496,850 | B1 | 12/2002 | Bowman-Amuah | 709/203 |
| 6,502,213 | B1 | 12/2002 | Bowman-Amuah | 714/49 |
| 6,510,513 | B1 | 1/2003 | Danieli | 713/156 |
| 6,529,909 | B1 | 3/2003 | Bowman-Amuah | 707/10 |
| 6,529,948 | B1 | 3/2003 | Bowman-Amuah | 709/217 |
| 6,539,396 | B1 | 3/2003 | Bowman-Amuah | 707/103 R |
| 6,549,949 | B1 | 4/2003 | Bowman-Amuah | 709/236 |
| 6,550,057 | B1 | 4/2003 | Bowman-Amuah | 717/126 |
| 6,571,282 | B1 | 5/2003 | Bowman-Amuah | 709/219 |
| 6,578,068 | B1 | 6/2003 | Bowman-Amuah | 709/203 |
| 6,601,192 | B1 | 7/2003 | Bowman-Amuah | 714/38 |
| 6,601,234 | B1 | 7/2003 | Bowman-Amuah | 717/108 |
| 6,606,660 | B1 | 8/2003 | Bowman-Amuah | 709/227 |
| 6,611,821 | B2 | 8/2003 | Stahl et al. | 705/400 |
| 6,615,199 | B1 | 9/2003 | Bowman-Amuah | 706/50 |
| 6,615,253 | B1 | 9/2003 | Bowman-Amuah | 709/219 |
| 6,615,263 | B2 | 9/2003 | Dulai et al. | 709/225 |
| 6,621,820 | B1 | 9/2003 | Williams et al. | 370/395.31 |
| 6,636,242 | B2 | 10/2003 | Bowman-Amuah | 715/764 |
| 6,640,238 | B1 | 10/2003 | Bowman-Amuah | 709/201 |
| 6,640,244 | B1 | 10/2003 | Bowman-Amuah | 709/207 |
| 6,647,262 | B1 | 11/2003 | Demetrescu et al. | 455/436 |
| 6,665,537 | B1 | 12/2003 | Lioy | 455/435 |
| 6,665,718 | B1 | 12/2003 | Chuah et al. | 709/225 |
| 6,671,675 | B2 | 12/2003 | Iwamura | 705/30 |
| 6,684,243 | B1 | 1/2004 | Euget et al. | 709/222 |
| 6,684,256 | B1 | 1/2004 | Warrier et al. | 709/238 |
| 6,708,225 | B1 | 3/2004 | Cho et al. | 709/317 |
| 6,714,515 | B1 | 3/2004 | Marchand | 370/231 |
| 6,715,145 | B1 | 3/2004 | Bowman-Amuah | 718/101 |
| 6,728,266 | B1 | 4/2004 | Sabry et al. | 370/468 |
| 6,728,365 | B1 | 4/2004 | Li et al. | 379/329 |
| 6,728,884 | B1 | 4/2004 | Lim | 713/201 |
| 6,742,015 | B1 | 5/2004 | Bowman-Amuah | 718/101 |
| 6,742,036 | B1 | 5/2004 | Das et al. | 709/226 |
| 6,757,371 | B2 | 6/2004 | Kim et al. | 379/114.22 |
| 6,760,444 | B1 | 7/2004 | Leung | 380/270 |
| 6,768,726 | B2 | 7/2004 | Dorenbosch et al. | 370/331 |
| 6,769,000 | B1 | 7/2004 | Akhtar et al. | 707/103 R |
| 6,771,623 | B2 | 8/2004 | Ton | 370/331 |
| 6,785,256 | B2 | 8/2004 | O'Neill | 370/338 |
| 6,804,518 | B2 | 10/2004 | Core et al. | 455/436 |
| 6,826,173 | B1 | 11/2004 | Kung et al. | 370/352 |
| 6,829,709 | B1 | 12/2004 | Acharya et al. | 713/160 |
| 6,834,341 | B1 | 12/2004 | Bahl et al. | 713/156 |
| 6,839,338 | B1 | 1/2005 | Amara et al. | 370/338 |
| 6,842,906 | B1 | 1/2005 | Bowman-Amuah | 719/330 |
| 6,856,676 | B1 | 2/2005 | Pirot et al. | 379/201.01 |
| 6,889,321 | B1 | 5/2005 | Kung et al. | 713/153 |
| 6,907,501 | B2 | 6/2005 | Tariq et al. | 711/118 |
| 6,910,074 | B1 | 6/2005 | Amin et al. | 709/227 |
| 6,915,345 | B1 | 7/2005 | Tummala et al. | 709/225 |
| 6,917,605 | B2 | 7/2005 | Kakemizu et al. | 370/338 |
| 6,920,503 | B1 | 7/2005 | Nanji et al. | 709/230 |
| 6,922,404 | B1 | 7/2005 | Narayanan et al. | 370/338 |
| 6,925,160 | B1 | 8/2005 | Stevens et al. | 379/121.05 |
| 6,947,401 | B2 | 9/2005 | El-Malki et al. | 370/331 |
| 6,961,774 | B1 | 11/2005 | Shannon et al. | 709/227 |
| 6,967,941 | B2 | 11/2005 | Roy | 370/338 |
| 6,978,128 | B1 | 12/2005 | Raman et al. | 455/414 |
| 6,980,802 | B2 | 12/2005 | Jung | 455/436 |
| 6,980,962 | B1 | 12/2005 | Arganbright et al. | 705/26 |
| 6,981,047 | B2 | 12/2005 | Hanson et al. | 709/227 |
| 6,982,967 | B1 | 1/2006 | Leung | 370/328 |
| 6,990,337 | B2 | 1/2006 | O'Neill et al. | 455/422.1 |
| 6,993,333 | B2 | 1/2006 | Laroia et al. | 455/436 |
| 7,003,294 | B2 | 2/2006 | Singhai et al. | 455/435.1 |
| 7,020,697 | B1 | 3/2006 | Goodman et al. | 709/223 |
| 7,024,687 | B2 | 4/2006 | Chaudhuri et al. | 726/3 |
| 7,028,311 | B2 | 4/2006 | Roach et al. | 719/328 |
| 7,039,027 | B2 | 5/2006 | Bridgelall | 370/329 |
| 7,054,268 | B1 | 5/2006 | Parantainen et al. | 370/231 |
| 7,079,499 | B1 | 7/2006 | Akhtar et al. | 370/310 |
| 7,082,301 | B2 | 7/2006 | Jagadeesan et al. | 455/436 |
| 7,103,359 | B1 | 9/2006 | Heinonen et al. | 455/436 |
| 7,127,234 | B2 | 10/2006 | Ishii | 455/411 |
| 7,130,286 | B2 | 10/2006 | Koodli et al. | 370/331 |
| 7,133,386 | B2 | 11/2006 | Holur et al. | 370/331 |
| 7,151,758 | B2 | 12/2006 | Kumaki et al. | 370/331 |
| 7,151,772 | B1 | 12/2006 | Kalmanek et al. | 370/390 |
| 7,154,868 | B1 | 12/2006 | Sharma et al. | 370/331 |
| 7,161,914 | B2 | 1/2007 | Shoaib et al. | 370/331 |
| 7,171,555 | B1 | 1/2007 | Salowey et al. | 713/156 |
| 7,184,418 | B1 | 2/2007 | Baba et al. | 370/331 |
| 7,187,931 | B2 | 3/2007 | Trossen | 455/440 |
| 7,190,793 | B2 | 3/2007 | Hsu | 380/270 |
| 7,197,763 | B2 | 3/2007 | Hsu | 726/4 |
| 7,212,821 | B2 | 5/2007 | Laroia et al. | 455/437 |
| 7,213,144 | B2 * | 5/2007 | Faccin et al. | 713/153 |
| 7,230,951 | B2 | 6/2007 | Mizell et al. | 370/401 |
| 7,233,583 | B2 | 6/2007 | Asthana et al. | 370/332 |
| 7,251,733 | B2 | 7/2007 | Haverinen et al. | 713/182 |
| 7,263,371 | B2 | 8/2007 | Das et al. | 455/456.1 |
| 7,269,727 | B1 | 9/2007 | Mukherjee et al. | 713/160 |
| 7,272,122 | B2 | 9/2007 | Trossen et al. | 370/331 |
| 7,272,123 | B2 | 9/2007 | Wall | 370/331 |
| 7,275,156 | B2 | 9/2007 | Balfanz et al. | 713/168 |
| 7,346,340 | B2 * | 3/2008 | Purnadi et al. | 455/414.1 |
| 7,389,106 | B2 | 6/2008 | Dawson et al. | 455/406 |
| 8,005,967 | B2 * | 8/2011 | Yendluri | 709/228 |
| 8,037,510 | B2 * | 10/2011 | Walker et al. | 726/2 |
| 8,185,935 | B2 | 5/2012 | Hsu | |
| 2001/0023428 | A1 | 9/2001 | Miyazaki et al. | 709/201 |
| 2002/0021681 | A1 | 2/2002 | Madour | 370/331 |
| 2002/0023174 | A1 | 2/2002 | Garrett et al. | 709/245 |
| 2002/0036982 | A1 | 3/2002 | Chen | 370/230 |
| 2002/0059114 | A1 | 5/2002 | Cockrill et al. | 705/27 |
| 2002/0091802 | A1 | 7/2002 | Paul et al. | 709/220 |
| 2002/0138601 | A1 | 9/2002 | Piponius et al. | 709/223 |
| 2002/0151312 | A1 | 10/2002 | Bos et al. | 455/452 |
| 2003/0021252 | A1 | 1/2003 | Harper et al. | 370/338 |
| 2003/0039237 | A1 | 2/2003 | Forslow | 370/352 |
| 2003/0154400 | A1 | 8/2003 | Pirttimaa et al. | 713/201 |
| 2003/0187817 | A1 | 10/2003 | Agrawal et al. | 707/1 |
| 2003/0217165 | A1 | 11/2003 | Buch et al. | 709/229 |
| 2004/0066764 | A1 * | 4/2004 | Koodli et al. | 370/331 |
| 2004/0114553 | A1 | 6/2004 | Jiang et al. | 370/328 |
| 2004/0162876 | A1 | 8/2004 | Kohavi | 709/203 |
| 2004/0162892 | A1 | 8/2004 | Hsu | 709/221 |
| 2004/0196821 | A1 | 10/2004 | Haddad et al. | 370/349 |
| 2004/0210524 | A1 | 10/2004 | Benenati et al. | 705/40 |
| 2004/0259562 | A1 | 12/2004 | Madour | 455/452.2 |
| 2005/0002407 | A1 | 1/2005 | Shaheen et al. | 370/401 |
| 2005/0025132 | A1 | 2/2005 | Harper et al. | 370/352 |
| 2005/0063352 | A1 * | 3/2005 | Amara et al. | 370/338 |
| 2005/0108531 | A1 * | 5/2005 | Swander et al. | 713/171 |
| 2005/0130659 | A1 | 6/2005 | Grech et al. | 455/436 |
| 2005/0147035 | A1 * | 7/2005 | Sylvain et al. | 370/230 |

| | | | |
|---|---|---|---|
| 2005/0149651 A1 | 7/2005 | Doak et al. .................... 710/52 |
| 2005/0176428 A1 | 8/2005 | Gabor et al. ............... 455/435.1 |
| 2005/0195766 A1 | 9/2005 | Nasielski et al. ............. 370/331 |
| 2005/0201324 A1 | 9/2005 | Zheng .......................... 370/328 |
| 2005/0213606 A1 | 9/2005 | Huang et al. .................. 370/467 |
| 2005/0220039 A1 | 10/2005 | Hoshino et al. ............... 370/261 |
| 2005/0271003 A1 | 12/2005 | Devarapalli et al. |
| 2005/0278420 A1 | 12/2005 | Hartikainen et al. ......... 709/203 |
| 2005/0286709 A1 | 12/2005 | Horton et al. ............ 379/265.09 |
| 2006/0014547 A1 | 1/2006 | Walter ....................... 455/456.1 |
| 2006/0018272 A1 | 1/2006 | Mutikainen et al. .......... 370/328 |
| 2006/0077924 A1 | 4/2006 | Rune .............................. 370/328 |
| 2006/0094423 A1 | 5/2006 | Sharma et al. |
| 2006/0116113 A1 | 6/2006 | Gass ........................... 455/414.4 |
| 2006/0126630 A1 | 6/2006 | Shirazipour et al. .......... 370/392 |
| 2006/0171310 A1 | 8/2006 | Ahluwalia et al. ............. 370/229 |
| 2006/0235973 A1 | 10/2006 | McBride |
| 2006/0251038 A1 | 11/2006 | Tamura et al. ................ 370/342 |
| 2006/0264207 A1 | 11/2006 | Tamura et al. ................ 455/415 |
| 2006/0268819 A1 | 11/2006 | Chen et al. .................... 370/329 |
| 2007/0008882 A1 | 1/2007 | Oran ............................. 370/229 |
| 2007/0036312 A1 | 2/2007 | Cai et al. ....................... 379/126 |
| 2007/0086582 A1 | 4/2007 | Tai et al. .................. 379/114.01 |
| 2007/0094712 A1 | 4/2007 | Gibbs et al. ....................... 726/3 |
| 2007/0121615 A1 | 5/2007 | Weill et al. .................... 370/389 |
| 2007/0121642 A1 | 5/2007 | Battin et al. ................ 370/395.2 |
| 2007/0153720 A1 | 7/2007 | Baglin et al. .................. 370/328 |
| 2007/0254661 A1 | 11/2007 | Chowdhury .................. 455/436 |
| 2009/0219848 A1* | 9/2009 | Lohmar et al. ................. 370/312 |

FOREIGN PATENT DOCUMENTS

| | | |
|---|---|---|
| WO | WO 99/31610 | 12/1998 |
| WO | WO 03/090041 A2 | 10/2003 |
| WO | WO 2005/107297 | 11/2005 |

OTHER PUBLICATIONS

USPTO, Office Action dated Aug. 19, 2008 for U.S. Appl. No. 11/715,073 in the name of Jonathan D. Rosenberg, 22 pages.
Office Action in U.S. Appl. No. 11/715,073 dated May 15, 2009, 12 pages.
USPTO Office Action, U.S. Appl. No. 11/715,073, filed Mar. 6, 2007, inventor Rosenberg, 9 pages, Sep. 25, 2009.
PCT Notification of Transmittal of the International Search Report and the Written Opinion of the International Searching Authority, or the Declaration with attached PCT International Search Report and Written Opinion of the International Searching Authority in International Application No. PCT/US2006/046800, dated Nov. 10, 2008, 10 pages.
USPTO Office Action, U.S. Appl. No. 11/715,032, dated Jun. 24, 2010, 11 pages.
USPTO Office Action, U.S. Appl. No. 11/715,073, dated Jul. 29, 2010, 8 pages.
USPTO, Final Office Action, U.S. Appl. No. 11/715,073, dated Mar. 31, 2011, 11 pages.
Supplementary European Search report in EPO Application No. 07752588.9-2416/ 1999618 PCT/US2007005900, dated Aug. 16, 2011, 9 pages.
Thi Mai Trang Nguyen et al., COPS-SLS Usage for Dynamic Policy-Based QoS Management over Heterogeneous IP Networks, *IEEE Network*, May/Jun. 2003, 7 pages.
Thi Mai Trang Nguyen et al., "COPS-SLS: A Service Level Negotiation Protocol for the Internet," *IEEE Communications Magazine*, May 2002, 8 pages.
USPTO, Final Office Action, U.S. Appl. No. 11/715,032, dated Dec. 8, 2010, 12 pages.
U.S. Patent and Trademark Office Official Action in U.S. Appl. No. 11/715,073, dated Sep. 1, 2011, 12 pages.
Online Inc., "Apogee Releases Content Usage-Based Billing Product Annotated Title—Software allows content usage-based billing," EContent, vol. 24, No. 5, NDN 173-035-66509-7, 1 pg, Jul. 2001.
Centaur Communications, "Secret Bear platform allows paid-for SMS Annotated Title—Secret Bear introduced cross-network reverse billing platform allowing content providers to charge for SMS content," New Media Age, NDN 173-0354-6130-3, 1 pg, Jun. 28, 2001.

Karsten Lüttge, "E-Charging API: Outsource Charging to a Payment Service Provider," NDN 174-0708-0924-8, pp. 216-227, 2001.
A. Herzberg, "Safeguarding Digital Library Contents: Charging for Online Content," D-Lib Magazine, NDN 174-0590-9051-8, 16 pgs, Jan. 1998.
Business Wire, "Apogee Networks Introduces Industry's First Content Usage-Based Billing Solution for Web Hosters," NDN 219-0281-6988-1, 2 pgs, May 8, 2001.
Business Wire, "Apogee Networks Announces Investment by Cisco Systems; Combined Efforts Enhance Billing Capabilities for Content Delivery Network Providers," NDN 219-0220-9035-0, 2 pgs, Jan. 23, 2001.
Business Wire, "Key Analysts Predict Content Billing is the Internet's New Frontier; Content is the Asset of the industry; Apogee Networks Seen as the Leader in New Internet Industry Space," NDN 219-0162-6934-6, 3 pgs, Oct. 10, 2000.
Business Wire, "Apogee Networks Unveils NetCountant Wireless Billing At SUPERCOMM; Company Demonstrates Industry First Wireless Content Usage Based Billing Solution," NDN 218-0324-8075-6, 2 pgs, Jun. 5, 2001.
Business Wire, "Apogee Networks Wins 2000 Communications ASP Product of the Year Award; Apogee Networks' NetCountant Billing Takes Top Honors for Innovative Content Usage Based Billing Solutions," NDN 218-0282-3757-7, 2 pgs, Mar. 21, 2001.
Business Wire, "Wireless Internet Content Billing and Settlement Capability Announced; Companies Announce Interoperability Between WAP Gateway and Content Billing System," NDN 218-0220-0997-2, 2 pgs, Dec. 6, 2000.
Business Wire, "Apogee Networks Joins Content Alliance; Billing Expert to Join Industry Group Aimed At Advancing Content Networking," NDN 218-0181-2716-7, 3 pgs, Oct. 11, 2000.
Business Wire, "Apogee Networks, Inc. and Paysys International, Inc. to Integrate Technologies to Create Advanced IP Content Billing Solutions," NDN 218-0098-0623-9, 3 pgs, Jun. 19, 2000.
Ylitalo, et al., *Re-thinking Security in IP based Micro-Mobility*, downloaded from www.tcs.hut.fi/Studies/T-79.5401/2005AUT/ISCO4-Vlitalo-e-al.pdf (12 pages).
PCT Notification of Transmittal of the International Search Report and the Written Opinion of the International Searching Authority, or the Declaration with attached PCT International Search Report and Written Opinion of the International Searching Authority in International Application No. PCT/US 07/05937, dated Oct. 25, 2007, 6 pages.
U.S. Patent and Trademark Office Official Action in U.S. Appl. No. 11/715,032, dated Oct. 15, 2012, 22 pages.
Draft—TR45-PN-3-4732-RV4 (to be published as TIA-835.1-D), 32 pages.
Draft—TR45-PN-3-4732-RV4 (to be published as TIA-835.2-D), 93 pages.
Draft—TR45-PN-3-4732-RV4 (to be published as TIA-835.3-D), 36 pages.
Draft—TR45-PN-3-4732-RV4 (to be published as TIA-835.4-D), 70 pages.
Draft—TR45-PN-3-4732-RV4 (to be published as TIA-835.5-D), 72 pages.
Draft—TR45-PN-3-4732-RV4 (to be published as TIA-835.6-D), 36 pages.
3GPP2 C.S0067, 3rd Generation Partnership Project 2 '3GPP2', "Generic Key Exchange Protocol for cdma2000 High Rate Packet Data Air Interface," Version 1.0, 24 pages, Nov. 2005.
3GPP2 X.S0011-001-D, 3rd Generation Partnership Project 2 '3GPP2', "cdma2000 Wireless IP Network Standard: Introduction," Version 1.0, 33 pages, Feb. 2006.
3GPP2 C.S0063-0, 3rd Generation Partnership Project 2 '3GPP2', "cdma2000 High Rate Packet Data Supplemental," Version 1.0, 127 pages, Mar. 2006.
3GPP2 A.S0008-A v.1.0, 3rd Generation Partnership Project 2 '3GPP2,' Interoperability Specification (IOS) for High Rate Packet Data (HRPD) Radio Access Network Interfaces with Session Control in the Access Network, 257 pages, Mar. 2006.
3GPP2 C.S0024-A, 3rd Generation Partnership Project 2 '3GPP2', "cdma2000 High Rate Packet Data Air Interface Specification," Version 2.0, 1,223 pages, Jul. 2005.

B. Aboba, et al., "Extensible Authentication Protocol (EAP)," Network Working Group, RFC 3748, http://www.ietf.org/rfc/rfc3748.txt, 59 pages, Jun. 2004.

B. Aboba, D. Simon, "PPP EAP TLS Authentication Protocol," Network Working Group, RFC 2716, http://www.ietf.org/rfc/rfc2716.txt, 22 pages, Oct. 1999.

W. Simpson, "PPP Challenge Handshake Authentication Protocol (CHAP)," Network Working Group, RFC 1994, http://www.ietf.org/rfc/rfc1994.txt, 12 pages, Aug. 1996.

W. Simpson, "The Point-to-Point (PPP)," Network Working Group, RFC 1661, http://www.ietf.org/rfc/rfc1661.txt, 47 pages, Jul. 1994.

P. Eronen, et al., "Diameter Extensible Authentication Protocol (EAP) Application," Network Working Group, RFC 4072, http://www.ietf.org/rfc/rfc4072.txt, 29 pages, Aug. 2005.

P. Calhoun, et al., "Diameter Base Protocol," Network Working Group, RFC 3588, http://www.ietf.org/rfc/rfc3588.txt, 129 pages, Sep. 2003.

3rd Generation Partnership Project 2 "3GPP2"; "All-IP Core Network Multimedia Domain: Service Based Bearer Control—Stage 2;www.3gpp2.org-"; Version 1.0. Draft Version 0.21.0, 49 pages.

PCT Notification of Transmittal of the International Search Report and the Written Opinion of the International Searching Authority, or the Declaration, International Application No. PCT/US07/05847, 9 pages, Oct. 26, 2007.

PCT Notification of Transmittal of the International Search Report and the Written Opinion of the International Searching Authority, or the Declaration, International Application No. PCT/US07/05849, 9 pages, Nov. 14, 2007.

Yegani et al., "System and Method for Access Authentication in a Mobile Wireless Network," U.S. Appl. No. 11/419,382, 20 pps, 3 pps. drawings, Filed May 19, 2006.

Yegani et al., "System and Method for Handover of an Access Terminal in a Communication Network," U.S. Appl. No. 11/682,735, 24 pps, 3 pps drawings, Filed Mar. 6, 2007.

Yegani et al., "Enforcement of User Level Policies from Visited Networks in a Mobile IP Environment," U.S. Appl. No. 11/682,817, 22 pps, 2 pps drawings, Filed Mar. 6, 2007.

Yegani et al, Authentication of Access Terminals in a Cellular Communication Network,: U.S. Appl. No. 11/682,857, 28 pps, 5pps drawings, Filed Mar. 6, 2007.

Andreasen et al., "System and Method of Consolidating Accounting Data for a Communication Session," U.S. Appl. No. 11/714,974, 40 pps, 3 pps drawings, Filed Mar. 6, 2007.

Panda et al., "System and Method for Capturing Accounting Data for a Communication Session," U.S. Appl. No. 11/715,018, Filed Mar. 6, 2007.

Rosenberg et al., "System and Method for Determining a Network for Processing Applications for a Communication Session," U.S. Appl. No. 11/715,019, 40 pps, 3 pps drawings. Filed Mar. 6, 2007.

Rosenberg et al., "Determining a Policy Output for a Communication Session," U.S. Appl. No. 11/715,032, 31 pps, 4 pps drawings, Filed Mar. 6, 2007.

Leung et al., "Communicating Packets Using a Home Anchored Bearer Path," U.S. Appl. No. 11/715,033, 33 pps, 4 pps drawings, Filed Mar. 6, 2007.

Andreasen et al., "Posture-Based Network Authentication," U.S. Appl. No. 11/715,040, 23 pages, 2 pps drawings, Filed Mar. 6, 2007.

Iyer et al., "Access Terminal for Communicating Packets Using a Home Anchored Bearer Path," U.S. Appl. No. 11/715,041, 33 pps, 4 pps drawings. Filed Mar. 6, 2007.

Rosenberg et al., "System and Method for Exchanging Policy Information in a Roaming Communications Environment," U.S. Appl. No. 11/715,056, 42 pps, 3 pps drawings, Filed Mar. 6, 2007.

Rosenberg et al., "Performing Deep Packet Inspection for a Communication Session," U.S. Appl. No. 11/715,073, 31 pps, 4 pps drawings, Filed Mar. 6, 2007.

Rosenberg et al., "Assigning a Serving-CSCF During Access Authentication," U.S. Appl. No. 11/715,074, 22 pps, 2 pps drawings, (2410), Filed Mar. 6, 2007.

Rosenberg et al., "System and Method for Providing Emergency Services in a Visited Communications Environment," U.S. Appl. No. 11/715,111, 39 pps, 2 pps drawings, Filed Mar. 6, 2007.

Panda et al., "Application-Aware Policy Enforcement," U.S. Appl. No. 11/715,187, 28 pps, 2 pps drawings, Filed Mar. 6, 2007.

Andreasen et al., "System and Method for Generating a Unified Accounting Record for a Communication Session," U.S. Appl. No. 11/715,210, 46 pps, 3 pps drawings, Filed Mar. 6, 2007.

Andreasen et al., "Network-triggered quality of service (QoS) Reservation," U.S. Appl. No. 11/715,250, 21 pps, 2 pps drawings, Filed Mar. 6, 2007.

Andreasen et al.,; "Policy-Based Control of Content Intercept", U.S. Appl. No. 11/715,251, 23 pps, 2 pps drawings, Mar. 2007.

Rosenberg et al., "System and Method for Network Charging Using Policy Peering," U.S. Appl. No. 11/715,256, 43 pps, 3 pps drawings, Filed Mar. 6, 2007.

* cited by examiner

ESTABLISHING FACETS OF A POLICY FOR A COMMUNICATION SESSION

RELATED APPLICATION

This application claims priority under 35 U.S.C. §119(e) of U.S. Provisional Application Ser. No. 60/780,176, entitled "VERIZON WIRELESS MULTI-MEDIA PLUS (MMD+) PROGRAM SYSTEM ARCHITECTURE DOCUMENT," filed Mar. 6, 2006, by Flemming Andreasen et al., which is incorporated herein by reference.

TECHNICAL FIELD

This invention relates generally to the field of telecommunications and more specifically to establishing facets of a policy for a communication session.

BACKGROUND

An endpoint, such as an access terminal, may use a system of communication networks to communicate packets with other endpoints during communication sessions. For example, an access terminal may subscribe to a home network that maintains subscription information for the access terminal. If the access terminal is outside of the serving area of the home network, the access terminal may use a visited network to communicate packets.

Certain known techniques may be used to make policy decisions, such as accounting or quality of service decisions, for these communication sessions. These known techniques, however, are not efficient in certain situations. In certain situations, it is generally desirable to be efficient.

SUMMARY OF THE DISCLOSURE

In accordance with the present invention, disadvantages and problems associated with previous techniques for communicating packets may be reduced or eliminated.

According to one embodiment of the present invention, establishing one or more facets of a policy includes facilitating a communication session for an access terminal at a visited network. The access terminal is associated with a home network having a home policy server. The policy is received at a visited policy server of the visited network. The policy comprises the facets. If the facets are unacceptable, the facets are negotiated between the visited network and the home network until a stopping point is reached. The negotiation includes adjusting by the visited policy server at least one facet of the one or more facets, and notifying the home policy server of the adjustment. The facets are established in accordance with the negotiation.

Certain embodiments of the invention may provide one or more technical advantages. A technical advantage of one embodiment may be that a home policy server of a home network may provide a policy to a visited policy server of a visited network. The policy may include application facets that allow the visited network to make policy decisions for an application without having to execute or otherwise support the application.

Another technical advantage of one embodiment may be that the visited policy server may negotiate with the home policy server to establish policy facets acceptable to the policy servers. The visited policy server need not be forced to use unacceptable policy facets.

Another technical advantage of one embodiment may be that one or more policy facets may be installed on a network element in the home network and/or the visited network. The policy facets may allow the network element to make policy decisions.

Another technical advantage of one embodiment may be that a deep packet inspection (DPI) facet may be dynamically installed on an edge router. The DPI facet may have a scope and rules based on a particular application invocation. The DPI facet may allow the edge router to perform deep packet inspection of the relevant packets at the edge router.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 5 of the drawings, like numerals being used for like and corresponding parts of the various drawings.

Figure 1:
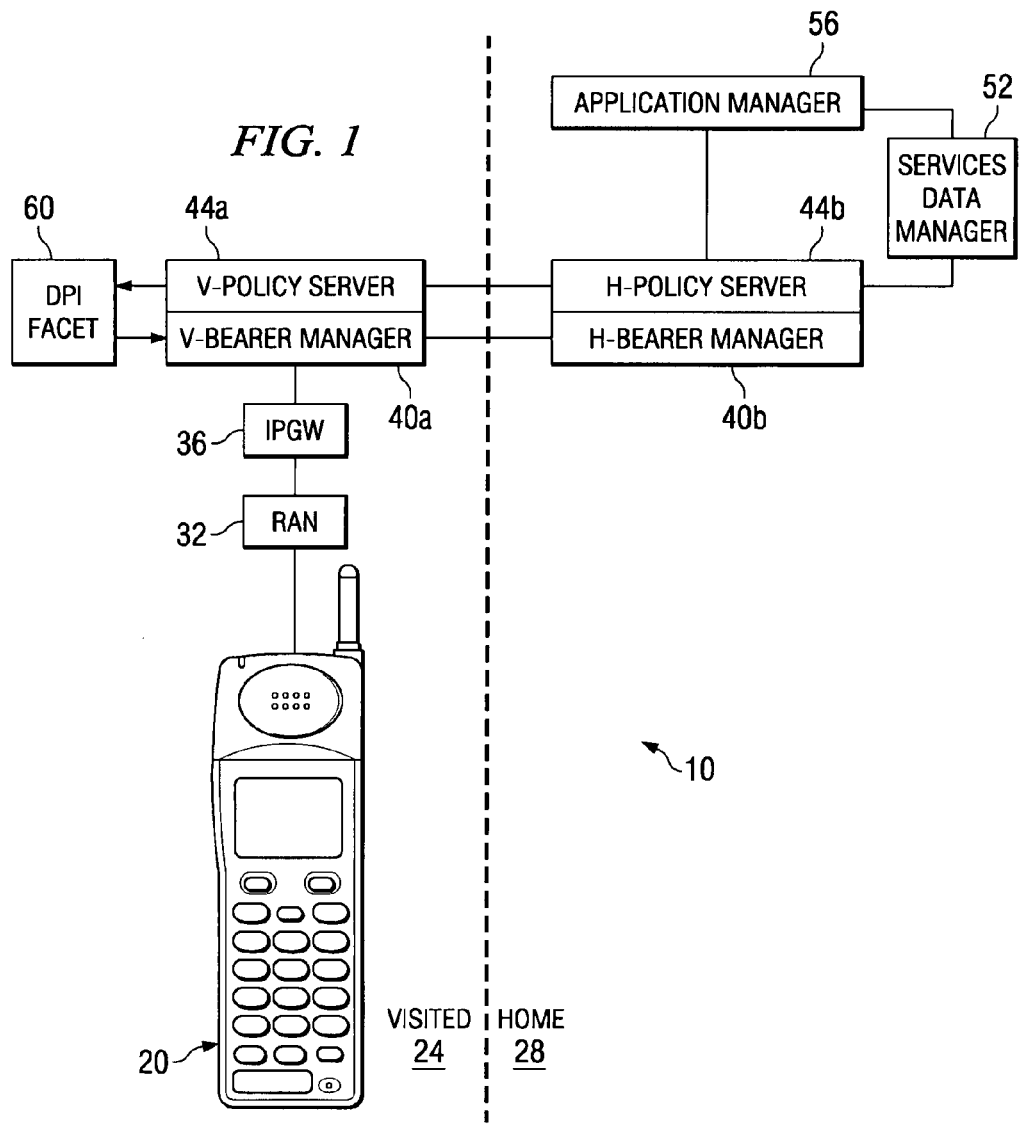
FIG. 1 illustrates one embodiment of a system that communicates packets for an access terminal.

FIG. 1 illustrates one embodiment of a system 10 that communicates packets for an access terminal 20. According to the embodiment, system 10 includes a visited network 24 and a home network 28. Visited network 24 includes a radio access network (RAN) 32, an Internet Protocol (IP) gateway (IPGW) 36, a visited bearer manager (V-bearer manager) 40a, and a visited policy server (V-policy server) 44a coupled as shown. Home network 28 includes a home bearer manager (H-bearer manager) 40b, a home policy server (H-policy server) 44b, a services data manager 52, and an application manager 56 coupled as shown.

According to certain examples, home policy server 44b may provide a policy to visited policy server 44a. The policy may include application facets that allow visited network 24 to make policy decisions for an application without having to execute or otherwise support the application. Application facets may comprise a set of one or more tokens (such as text-strings) that identify an application and/or components of the application. The tokens are understood by home policy server 44b and visited network policy server 44a. In one example, visited policy server 44a may negotiate with home policy server 44b to establish acceptable policy facets, so visited policy server 44a need not be forced to use unacceptable policy facets. In another example, a policy facet may be installed on a network element to allow the network element to make policy decisions. For example, a deep packet inspection (DPI) facet may be installed on an edge router to allow the edge router to perform deep packet inspection of the packets at the edge router.

According to the illustrated embodiment, system 10 provides services such as communication sessions to endpoints such as access terminal 20. A communication session refers to an active communication between endpoints. Information may be communicated during a communication session. Information may include voice, data, text, audio, video, multimedia, control, signaling, and/or other information. Information may be communicated in packets, each comprising a bundle of data organized in a specific way for transmission.

System 10 may utilize communication protocols and technologies to provide communication sessions. Examples of communication protocols and technologies include those set by the Institute of Electrical and Electronics Engineers, Inc. (IEEE) standards, the International Telecommunications Union (ITU-T) standards, the European Telecommunications Standards Institute (ETSI) standards, the Internet Engineering Task Force (IETF) standards (for example, IP such as mobile IP), or other standards.

According to the illustrated embodiment, access terminal 20 represents any suitable device operable to communicate with a communication network. For example, a subscriber may use access terminal 20 to communicate with a communication network. Access terminal 20 may comprise, for example, a personal digital assistant, a computer such as a laptop, a cellular telephone, a mobile handset, and/or any other device operable to communicate with system 10.

System 10 includes communication networks such as visited network 24 and home network 28. In general, a communication network may comprise at least a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication links, or any combination of any of the preceding.

In the illustrated embodiment, visited network 24 represents a communication network that facilitates a communication session for access terminal 20 within the serving area of visited network 24. Home network 28 represents a communication network that maintains a subscription for the subscriber using access terminal 20. The subscription for a subscriber may have subscriber identifier that uniquely identifies the subscriber, and may include an account that is charged based upon usage by access terminal 20. Visited network 24 and home network 28 may be part of the same or different communication networks.

Radio access network 32 provides access services to access terminal 20. For example, radio access network 32 may provide Layer 2 mobile access, mobility, and/or handoff services within its area of coverage.

IP gateway 36 operates as a gateway between radio access network 32 and an IP network. IP gateway 36 may perform operations such as authenticating access terminal 20, assigning a bearer manager 40 to access terminal 20, performing handoff functions between IP gateway 36 and radio access network 32, and/or facilitating registration of access terminal 20 to the IP network.

Bearer managers 40 provide bearer paths that communicate packets to and/or from access terminal 20. According to one embodiment, a bearer manager 40 operates as an anchor for a bearer path. Bearer manager 40 may operate as a home or foreign agent that authorizes use of a network address that allows access terminal 20 to use the bearer path anchored by bearer manager 40.

Bearer managers 40 may perform other suitable operations to provide services to access terminal 20. Examples of other suitable operations include processing signaling, committing resources, and maintaining gateways for access terminal 20. A bearer manager 40 may comprise any suitable device, for example, a Serving General Packet Radio Services (GPRS) Support Node (SGSN), a GPRS Gateway Support Node (GGSN), a home/foreign agent, a mobile gateway, a mobile IPv6 node, or a Packet Data Serving Node (PDSN). A bearer manager 40 may use any suitable protocol, for example, an IP Multimedia Subsystem (IMS) protocol.

Policy servers 44 manage policies. A policy may include one or more policy rules, where a policy rule specifies an action to be taken if one or more conditions are satisfied. A policy may include facets, which are policy rules that may be installed and executed on a network element. A facet may allow a network element to make policy decisions.

In one embodiment, a deep packet inspection (DPI) facet 60 may be installed on any suitable edge router to allow the edge router to perform deep packet inspection on packets. DPI facet 60 may specify packets to be inspected and rules to be applied to the packets. DPI facet 60 may be used to find SIP packets, verify media (such as Real-Time Transport Protocol (RTP) media) of the media packets, and otherwise inspect the packets sent through the edge router. In one example, DPI facet 60 may be installed on visited bearer manager 40a. Policy and facets are described in more detail with reference to FIG. 2.

Services data manager (SDM) 52 stores subscriber data for access terminals 20. According to one embodiment, services data manager 52 may store policy documents that define policies. One or more subscribers may be associated with a particular policy document that defines the policies for those subscribers.

Application manager 56 manages applications, such as SIP applications and/or other suitable applications. The applications may be used to perform SIP operations (such as SIP registration, authorization, and routing), voice features (such as call routing and call forwarding), services (such as push-to-talk (PTT) and IP Centrex), Service Capabilities Interaction Management (SCIM), user presence services, and/or other operations. A non-SIP application manager may be used to perform non-SIP operations, such as Real-Time Streaming Protocol (RTSP) media operations, proprietary gaming operations, and/or other operations. Application manager 56 may communicate with policy server 44 to request a policy to be implemented on its behalf for a particular access terminal 20.

A component of system 10 may include any suitable arrangement of elements, for example, an interface, logic, memory, other suitable element, or combination of any of the preceding. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Certain logic, such as a processor, may manage the operation of a component. Examples of a processor include one or more computers, one or more microprocessors, one or more applications, and/or other logic.

A memory stores information. A memory may comprise computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), other computer-readable medium, or a combination of any of the preceding.

Modifications, additions, or omissions may be made to system 10 without departing from the scope of the invention. The components of system 10 may be integrated or separated according to particular needs. Moreover, the operations of system 10 may be performed by more, fewer, or other modules. Additionally, operations of system 10 may be performed using any suitable logic. As used in this document, "each" refers to each member of a set or each member of a subset of a set.

Figure 2:
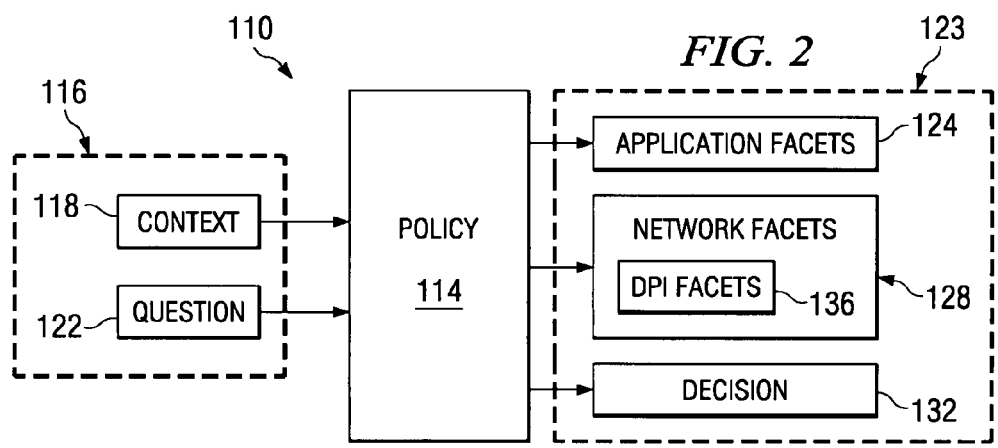
FIG. 2 illustrates an example of a policy model that may be used with the system of FIG. 1.

FIG. 2 illustrates an example of a policy model 110 that may be used with system 10 of FIG. 1. In one embodiment, policy model 110 includes a policy 114, one or more inputs 116 (such as a policy context 118 and a question 122), and one or more outputs 123 (such as application facets 124, network facets 128, and a decision 132). Network facets 128 may include deep packet inspection (DPI) facets 136.

Policy 114 may be embodied by logic that may be executed by policy server 44. Policy 114 may include one or more policy rules, where a policy rule specifies an action to be taken if one or more conditions are satisfied. Inputs 116 are used to determine whether conditions are satisfied, and outputs 123 describe the actions to be taken.

In the illustrated embodiment, inputs 116 include policy context 118 and question 122. Policy context 118 represents information that may be used to obtain an output 123 from a policy rule. Policy context 118 may include the identity of a subscriber, the application that a subscriber is trying to invoke, the network in which a subscriber is present, and/or other information to which a policy rule may be applied.

Question 122 invokes application of a policy 114. Question 122 may have the form, "Subscriber X has sent a request Y, with policy context Z". In response to question 122, policy server 44 applies policy 114 to the request Y for subscriber X with policy context Z to yield an output 123.

In the illustrated embodiment, outputs 123 include application facets 124, network facets 128, and a decision 132. Decision 132 specifies one or more actions to be taken and are determined in accordance with the application of policy 114. Decision 132 may be determined according to any suitable factor, for example, the requesting provider, current resource usage, and/or other suitable factor.

A facet is itself a policy that may be installed and executed (for example, enforced) on any suitable network component, for example, IP gateway 36, bearer manager 40, and/or application manager 56. In one embodiment, a facet may allow a network element to make policy decisions for a subscriber. For example, bearer manager 40 may be used to make accounting, DPI, roaming, and/or other suitable policy decisions. IP gateway 36 may be used to make quality of service, accounting, and/or other suitable policy decisions.

Facets may be installed in a push or pull mode. In the push mode, policy server 44 actively pushes a facet to a network element, for example, bearer manager 40. The network element may decide whether the installation can succeed, and either rejects or accepts the installation.

In the pull mode, the network component receives a request from a subscriber. The component asks policy server 44 whether the request can be granted. Policy server 44 provides an output 123, which may include facets. In certain cases, policy server 44 may not be able to provide an immediate response. For example, approval of a request may require additional information that needs to be obtained. In this case, policy server 44 may answer with a pending response.

A facet may include tokens that specify the conditions and actions of the facet. Tokens for the conditions may specify a subscriber identifier and a packet classifier. Tokens for the actions specify actions to be taken for the subscriber with the subscriber identifier and packets that match the packet classifier. In one embodiment, the tokens may be generic, in that home network 28 and visited network 24 agree upon the usage of the tokens.

In one embodiment, a packet may match a packet classifier if characteristics of the packet satisfy conditions of the packet classifier. For example, a packet classifier may include an IP address and/or port range. A packet that has the IP address and uses a port in the port range may be regarded as matching the packet classifier.

Application facets 124 govern the processing of application requests. Application facets 124 may include a policy decision and one or more tokens. The policy decision may specify whether an application should proceed or terminate, and the tokens may specify actions that the application should perform. Application facets 124 may be installed any suitable network component, for example, application manager 56 and/or bearer manager 44 acting as a application proxy. An application facet 124 may identify an application and application parameters.

Network facets 128 perform network functions such as mobility, access, quality of service, transcoding, accounting, DPI, and/or other functions. A network facet 128 may request network resources for performing the functions. Examples of network facets 128 include mobility, access, quality of service, accounting, transcoding, DPI, and/or other suitable facets.

Mobility facets include rules for mobility decisions. Examples of mobility facets include roaming, handoff, active/dormant reporting, paging filter, and/or other suitable mobility facets. A roaming facet specifies whether roaming is permitted. A handoff facet specifies how handoff is to operate between the same and/or different access technologies. The handoff facet may specify whether handoff is permitted across different network technologies and whether handoff should retrigger authentications. An active/dormant reporting facet indicates whether to report the active/dormant state of access terminal 20 to policy server 44. A paging filter facet specifies packets that initiate paging of client 20.

Access facets include rules for access decisions. A permitted correspondents facet is an example of an access facet. A permitted correspondents facet specifies a set of packets that client 20 is allowed to send or receive. A permitted correspondents facet may be provided to a network element, such as bearer manager 20, statically during mobile IP registration or dynamically in response to a request.

Quality of service facets include rules for quality of service decisions. Examples of quality of service facets include bandwidth reservation, packet marker, traffic shaper/policer, authorization envelope, and/or other suitable quality of service facets. A bandwidth reservation facet specifies the amount of bandwidth for a set of packets. A packet marker facet sets a differential service code point for a set of packets. A traffic shaper/policer facet indicates packets to be dropped, marked, and/or shaped. An authorization envelope facet indicates a maximum authorized bandwidth for an access terminal 20. If access terminal 20 requests more, an authorization request is sent to policy server 44.

Transcoding facets include rules for transcoding decisions. A transcoder facet is an example of a transcoding facet. A transcoder facet identifies a stream, for example, a Real-Time Transport Protocol (RTP) stream, that requires transcoding.

Accounting facets include rules for accounting decisions. Examples of accounting facets include packet counter, threshold, time trigger, and/or other suitable accounting facet. A packet counter facet counts a particular type of packet. A threshold facet specifies a maximum and/or minimum value for a specific counter. If the threshold is exceeded, then policy server 44 may be notified. A time trigger facet specifies a timer value for a specific packet counter. When the time value is reached, policy server 44 may be notified.

Deep packet inspection (DPI) facets include rules for deep packet inspection decisions. A DPI facet specifies packets to inspect, what to inspect or detect, and actions to take if packets with certain features are detected. An application detection facet is an example of a DPI facet. An application detection facet may be used to inspect packets to detect the presence of an application, and may specify actions to take if the application is detected.

A DPI facet may include a subscriber identifier, application identifier, and/or packet classifiers. The subscriber identifier and application identifier may identify the subscriber and application, respectively, for which packets are to be inspected. The packet classifiers may include the IP address and port range of packets to be inspected. The IP address and port range may be used to validate the usage of applications and their associated packets signaled through protocols such as SIP.

Packets may be inspected for any suitable feature, for example, packet signature, bandwidth used by packets, compression protocol, content, or other suitable feature. For example, packets may be inspected to determine whether the packets include what they are supposed to include, for example, whether the packets include voice and audio instead of copyrighted files. Actions may include terminating an application, allowing the application, or notifying policy server 44 of the presence of the application. Policy server 44 may then take further action.

According to one embodiment, a particular network facet may include tokens for different types of facets. The tokens may specify, for example, a packet classifier, a network facet state, a quality of service parameter, an authorized quality of service, and/or other suitable parameters. The packet classifier specifies the packets that are allowed through a network element. The network facet state specifies whether packets matching the packet classifier can flow through a gateway. The quality of service parameters specifies the granted quality of service. The authorized quality of service may specify the authorized envelope for the IP flow.

According to one embodiment, network facets 128 may be correlated with application facets 124. A network facet 128 may be correlated with an application facet 124 if a packet either matches the packet classifiers of both the network facet 128 and application facet 124 or matches the packet classifiers of neither. For example, a policy server 44 may match a network facet with a later-arriving application facet to make an application aware policy decision and install the decision on a network element.

Policies 114 may be static or dynamic. The facets of static policies are installed at a particular time, for example, when access terminal 20 registers with a network 24 or 28. Static policies typically depend on policy contexts that are fixed during the lifetime of the registration, such as the identity of the subscriber. The facets of dynamic policies are installed at the time access terminal 20 invokes an application.

Policies 114 may be shared between visited network 24 and home network 28. Visited network 24 and home network 28 may have agreements to recognize specific facets. Accordingly, visited network 24 that receives a policy 114 from home network 28 may make application aware policy decisions based on the policy 114 without having to deploy or otherwise support the application in question. For example, visited network 24 may de-prioritize a quality of service request for one application over another application, even though visited network 24 has not deployed either application.

Figure 3:
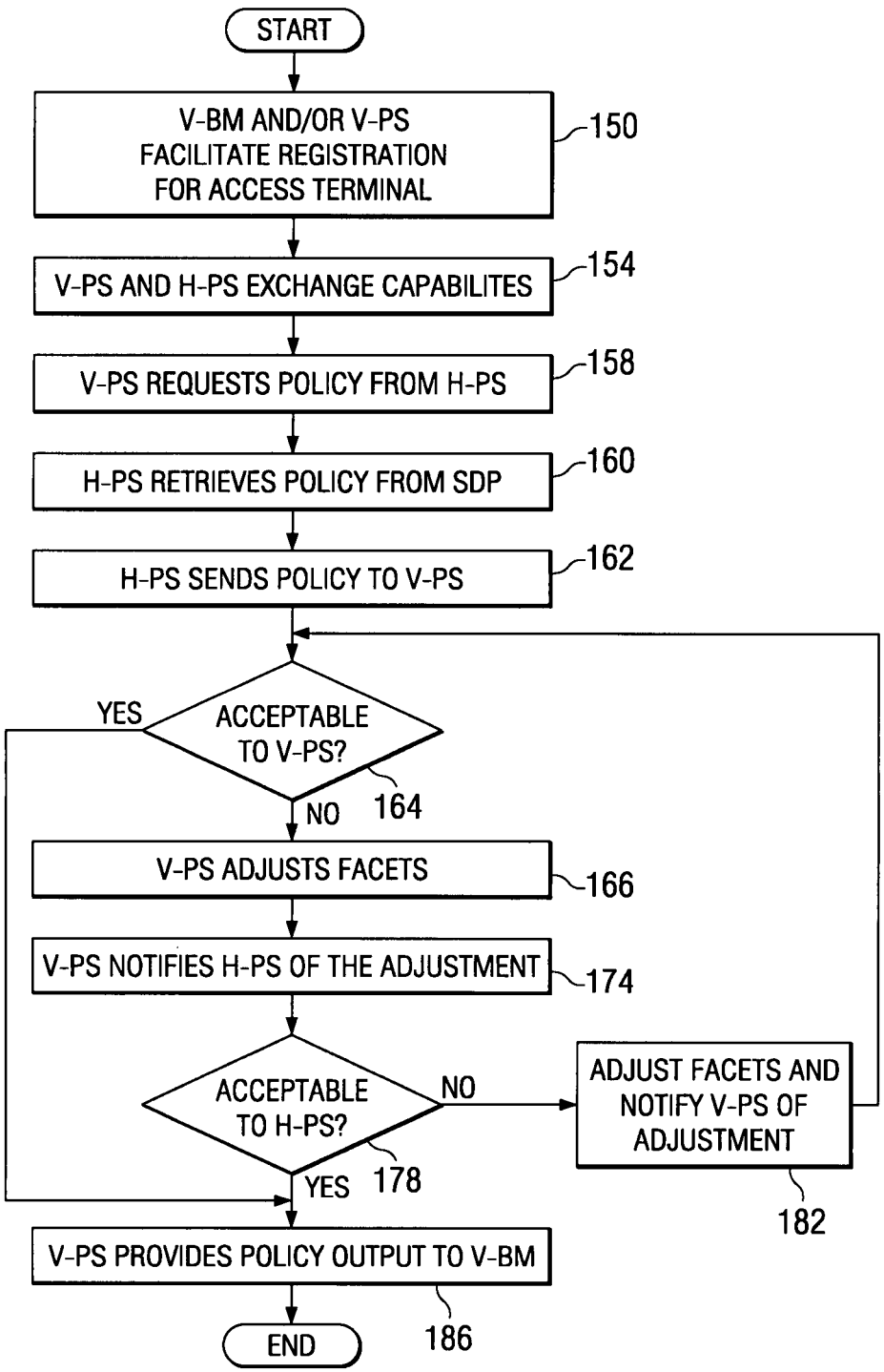
FIG. 3 illustrates an example of a call flow for establishing policy facets that may be used by the system of FIG. 1.

FIG. 3 illustrates an example of a call flow for establishing policy facets that may be used by system 10 of FIG. 1. The method begins at step 150, where visited bearer manager 40a and/or visited policy server 44a facilitate registration for access terminal 20. Facilitating registration may involve receiving and sending messages for registration. Visited policy server 44a and home policy server 44b exchange capabilities at step 154 to establish the facets that each policy server 44 may support.

Visited policy server 44a requests a policy from home policy server 44b at step 158. Home policy server 44b retrieves the requested policy from services data manager 52 at step 160. The policy may include facets, for example, network and application facets. Home policy server 44b sends the policy to visited policy server 44a at step 162.

Steps 164 through 182 describe negotiation of facets. The facets may be acceptable to visited policy server 44a at step 164. In one embodiment, facets may be acceptable if they are not unacceptable. Facets may be unacceptable to a policy server 44 if policy server 44 does not support a facet or if a facet is incompatible with policies present at policy server 44. Facets of different policies may be considered incompatible if policy server 44 cannot satisfy both facets, for example, if the facets are contradictory.

Visited policy server 44a may identify an application from an application identifier of an application facet to determine whether the facets are acceptable. If the facets are acceptable, the method proceeds directly to step 186. If the facets are not acceptable, the method proceeds to step 166, where visited policy server 44a adjusts one or more of the facets. A policy server 44 may adjust a facet by changing a parameter of a facet to make the facet acceptable to policy server 44 or by removing the facet.

Visited policy server 44a notifies home policy server 44b of the adjustment at step 174. A policy server 44 may notify another policy server 44 of an adjustment by sending the adjusted facets 44 or by sending a description of the changes that make the adjustment.

The facets may be acceptable to home policy server 44b at step 178. In one embodiment, if visited policy server 44a does not support facets that apply to particular packets, home policy server 44b may instruct access terminal 20 to tunnel these packets to home bearer manager 44a for application of the facets.

If the facets are not acceptable, the method proceeds to step 182, where home policy server 44b adjusts one or more of the facets and notifies visited policy server 44a of the adjustment. The method then returns to step 164, where facets may be acceptable to visited policy server 44a. If the facets are acceptable, the method proceeds directly to step 186.

Negotiation may continue until a stopping point is reached. A stopping point may be reached when policy servers 44 agree on the facets, that is, when the facets are acceptable to policy servers 44. A stopping point may be reached when a specified number of iterations, for example, one, two, or three iterations, have been performed. If the facets are not acceptable and a stopping point has been reached, policy servers 44 may give up.

Visited policy server 44*a* determines a policy output according to the policy rules of the facets, and provides the policy output to visited bearer manager 40*a* at step 186. The policy output may comprise facets or a policy decision. The method then ends.

Modifications, additions, or omissions may be made to the method without departing from the scope of the invention. The method may include more, fewer, or other steps. Additionally, steps may be performed in any suitable order.

Figure 4:
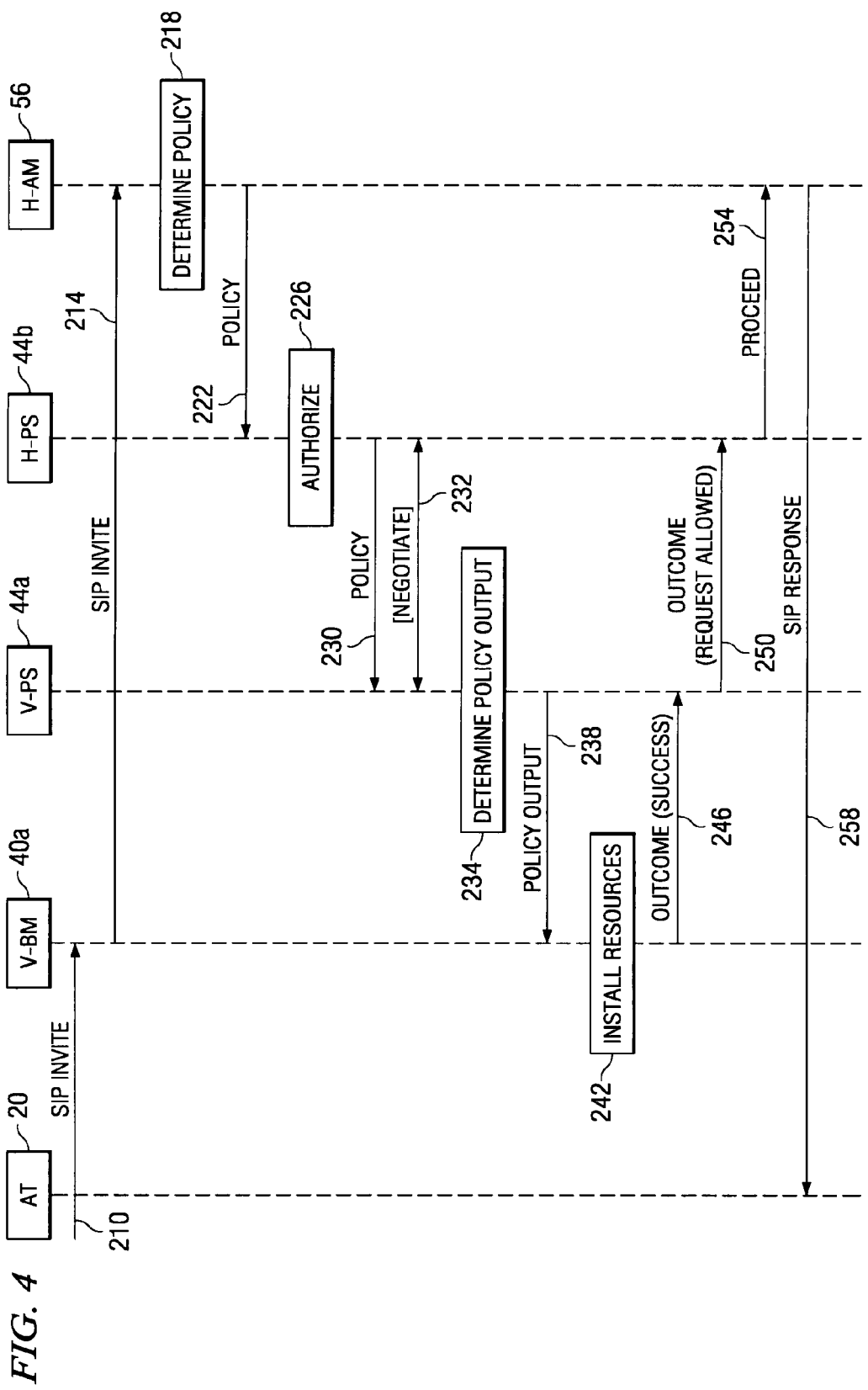
FIG. 4 illustrates an example of a call flow for determining a policy output that may be used by the system of FIG. 1.

FIG. 4 illustrates an example of a call flow for determining a policy output that may be used by system 10 of FIG. 1. Access terminal 20 sends a SIP invite message to visited bearer manager 40*a* at step 210. The message uses the visited network address as the care-of address. The message includes Session Data Protocol (SDP) specifying that media streams use the visited network address. This indicates that policies may be exchanged between home network 28 and visited network 24. Visited bearer manager 40*a* forwards the SIP invite to application manager 56 through home bearer manager 40*b* at step 214.

Application manager 56 determines a policy associated with the subscriber of access terminal 20 at step 218. The policy may include application facets. For example, an application facet may specify a telephony application with audio and video components. Application manager 56 sends the policy with the facets at step 222.

Home policy server 44*b* authorizes the policy at step 226. Home policy 44*b* forwards the policy to visited policy server 44*a* at step 230. Visited policy server 44*a* may negotiate the facets with home policy server 44*a* at step 232. For example, for a video call, visited policy server 44*a* may inform home policy server 44*b* that the request may proceed only with audio capabilities, and home policy server 44*b* may agree. Visited policy server 44*a* determines policy output for visited bearer manager 40*a* at step 234. For example, resources are granted for audio, but not for video, capabilities.

Visited policy server 44*a* sends the policy output to visited bearer manager 40*a* at step 238. In one embodiment, the policy output may include network facets that bearer manager 40*a* may implement. In another embodiment, the policy output may include a policy decision such as an authorization to perform the request with only audio capabilities.

Visited bearer manager 40*a* installs resources according to the network facets at step 242. Visited bearer manager 40*a* sends an outcome message indicating success at step 246. Visited policy server 44*a* sends an outcome message indicating that the request was allowed at step 250. Home policy server 44*b* instructs application manager 56 to proceed at step 254. Application manager 56 forwards the SIP response to access terminal 20 at step 258. The method then ends.

Modifications, additions, or omissions may be made to the method without departing from the scope of the invention. The method may include more, fewer, or other steps. Additionally, steps may be performed in any suitable order.

Figure 5:
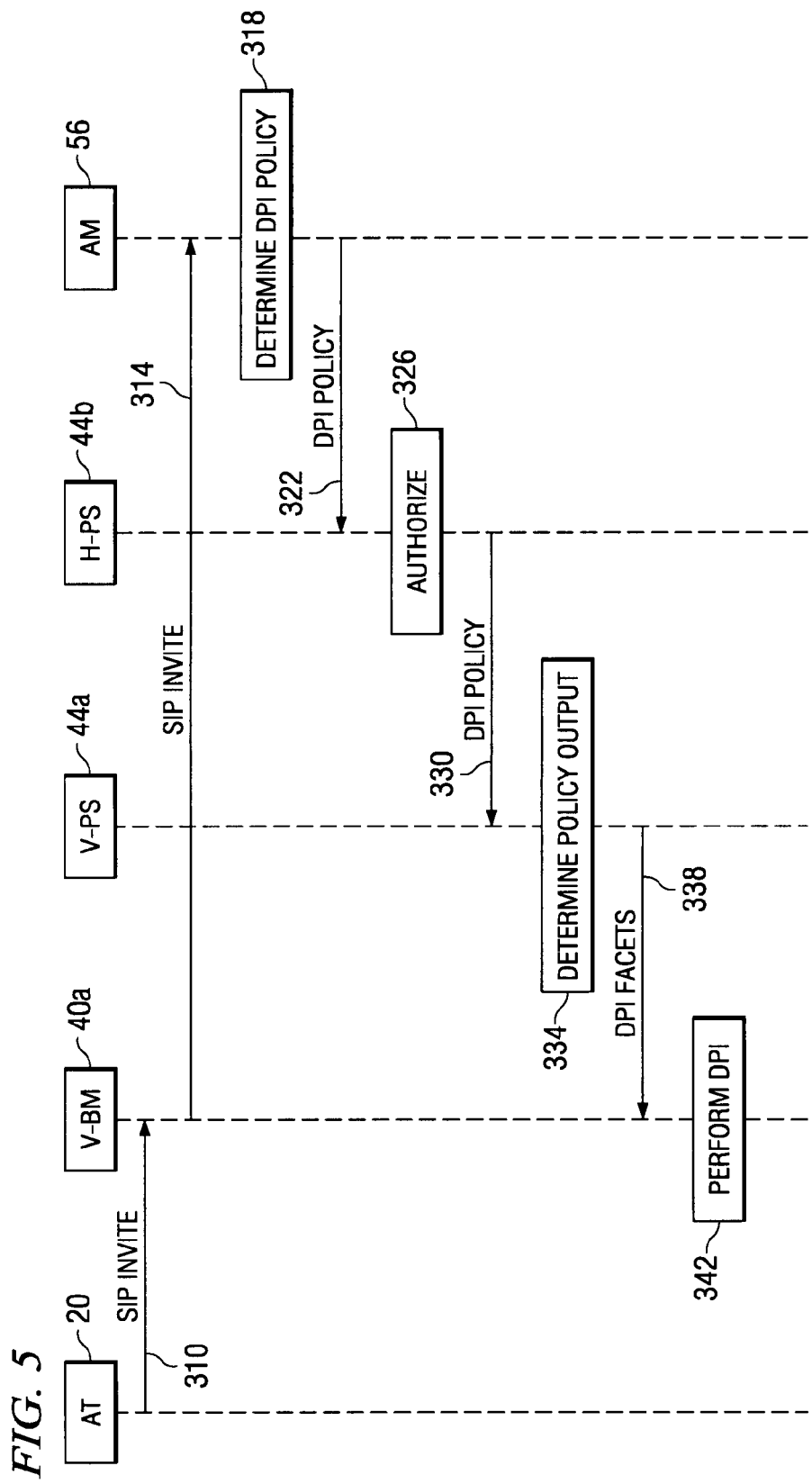
FIG. 5 illustrates an example of a call flow for implementing a deep packet inspection policy that may be used by the system of FIG. 1.

FIG. 5 illustrates an example of a call flow for implementing a deep packet inspection policy that may be used by system 10 of FIG. 1. Access terminal 20 sends a SIP invite message to visited bearer manager 40*a* at step 310. Visited bearer manager 40*a* forwards the SIP invite to application manager 56 at step 314.

Application manager 56 determines a DPI policy associated with the subscriber of access terminal 20 at step 318. The DPI policy includes DPI facets. The facets may, for example, be used to inspect media streams to verify that the streams are sending RTP audio media. A DPI facet may include packet classifiers that specify IP addresses and ports to identify packets to be inspected. Application manager 56 sends the DPI policy with the DPI facets at step 322. Home policy server 44*b* authorizes the policy at step 326. Home policy server 44*b* forwards the policy to visited policy server 44*a* at step 330. Visited policy server 44*a* determines a policy output that includes the DPI facets at step 334.

Visited policy server 44*a* sends the DPI facets to visited bearer manager 40*a* at step 338. In one embodiment, the policy output may include network facets that bearer manager 40*a* may implement. Visited bearer manager 40*a* performs deep packet inspection according to the DPI facets at step 242. Visited bearer manager 40*a* may inspect packets that match the packet classifiers of the DPI facets. The method then ends.

Modifications, additions, or omissions may be made to the method without departing from the scope of the invention. For example, the method may also be applied to access terminal 20 in home network 28. The method may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method for establishing a plurality of facets of a policy for a communication session, comprising:
    facilitating registration of an access terminal at a visited network, the access terminal associated with a home network having a home policy server;
    receiving the policy at a non-transitory visited policy server of the visited network, the policy comprising the facets;
    determining that a first facet is unacceptable;
    determining that a second facet identifies an application at the home network that is not supported by the visited network;
    establishing, by the visited policy server, a policy output based on the application even though the visited policy server does not support the application;
    negotiating the first facet until a stopping point is reached, the negotiation comprising:
        adjusting by the visited policy server at least one facet that applies to one or more particular packets, the at least one facet not supported by the visited policy server;
        notifying the home policy server of the adjustment;
        receiving a notification if the at least one facet adjusted by the visited policy server is acceptable; and
    establishing the first facet in accordance with the negotiation.

2. The method of claim 1, wherein negotiating the facets further comprises:
    receiving a response comprising at least one facet adjusted by the home policy server; and
    continuing negotiation if:
        the at least one facet adjusted by the home policy server is unacceptable; and
        the stopping point has not been reached.

3. The method of claim 1, wherein negotiating the facets further comprises:
    determining if the received policy is compatible with a policy at the visited policy server.

4. The method of claim 1, wherein the facets further comprises:
   a network facet requesting one or more network resources for an application.

5. The method of claim 1, wherein the stopping point comprises at least one of the following:
   a predetermined number of iterations have been performed; and
   the facets are acceptable to the home policy server and the visited policy server.

6. A visited policy server of a visited network, comprising:
   a non-transitory memory operable to:
      store a policy comprising a plurality of facets; and
   a non-transitory processor in communication with the memory and operable to:
      facilitate registration of an access terminal at the visited network, the access terminal associated with a home network having a home policy server;
      receive the policy;
      determine that a first facet is unacceptable;
      determine that a second facet identifies an application at the home network that is not supported by the visited network;
      establish, by the visited policy server, a policy output based on the application even though the visited policy server does not support the application;
      negotiate the first facet until a stopping point is reached, the negotiation comprising:
         adjusting by the visited policy server at least one facet that applies to one or more particular packets, the at least one facet not supported by the visited policy server;
         notifying the home policy server of the adjustment;
         receiving a notification if the at least one facet adjusted by the visited policy server is acceptable; and
      establish the first facet in accordance with the negotiation.

7. The visited policy server of claim 6, the processor further operable to negotiate the facets by:
   receiving a response comprising at least one facet adjusted by the home policy server; and
   continuing negotiation if:
      the at least one facet adjusted by the home policy server is unacceptable; and
      the stopping point has not been reached.

8. The visited policy server of claim 6, the processor further operable to negotiate the facets by:
   determining if the received policy is compatible with a policy at the visited policy server.

9. The visited policy server of claim 6, wherein the facets further comprises:
   a network facet requesting one or more network resources for an application.

10. The visited policy server of claim 6, wherein the stopping point comprises at least one of the following:
    a predetermined number of iterations have been performed; and
    the facets are acceptable to the home policy server and the visited policy server.

11. Logic for establishing a plurality of facets of a policy for a communication session, the logic embodied in a non-transitory computer-readable storage medium and operable to:
    facilitate registration of an access terminal at a visited network, the access terminal associated with a home network having a home policy server;
    receive the policy at a visited policy server of the visited network, the policy comprising the facets;
    determine that a first facet is unacceptable;
    determine that a second facet identifies an application at the home network that is not supported by the visited network;
    establish, by the visited policy server, a policy output based on the application even though the visited policy server does not support the application;
    negotiate the first facet until a stopping point is reached, the negotiation comprising:
       adjusting by the visited policy server at least one facet that applies to one or more particular packets, the at least one facet not supported by the visited policy server;
       notifying the home policy server of the adjustment;
       receiving a notification indicating acceptance of the at least one facet adjusted by the visited policy server; and
    establish the first facet in accordance with the negotiation.

12. The logic of claim 11, further operable to negotiate the facets by:
    receiving a response comprising at least one facet adjusted by the home policy server; and
    continuing negotiation if:
       the at least one facet adjusted by the home policy server is unacceptable; and
       the stopping point has not been reached.

13. The logic of claim 11, further operable to negotiate the facets by:
    determining if the received policy is compatible with a policy at the visited policy server.

14. The logic of claim 11, wherein the facets further comprises:
    a network facet requesting one or more network resources for an application.

15. The logic of claim 11, wherein the stopping point comprises at least one of the following:
    a predetermined number of iterations have been performed; and
    the facets are acceptable to the home policy server and the visited policy server.

* * * * *